July 4, 1933.    C. D. PETERSON    1,916,893
TWO-WAY CLUTCH DEVICE
Filed Oct. 12, 1932
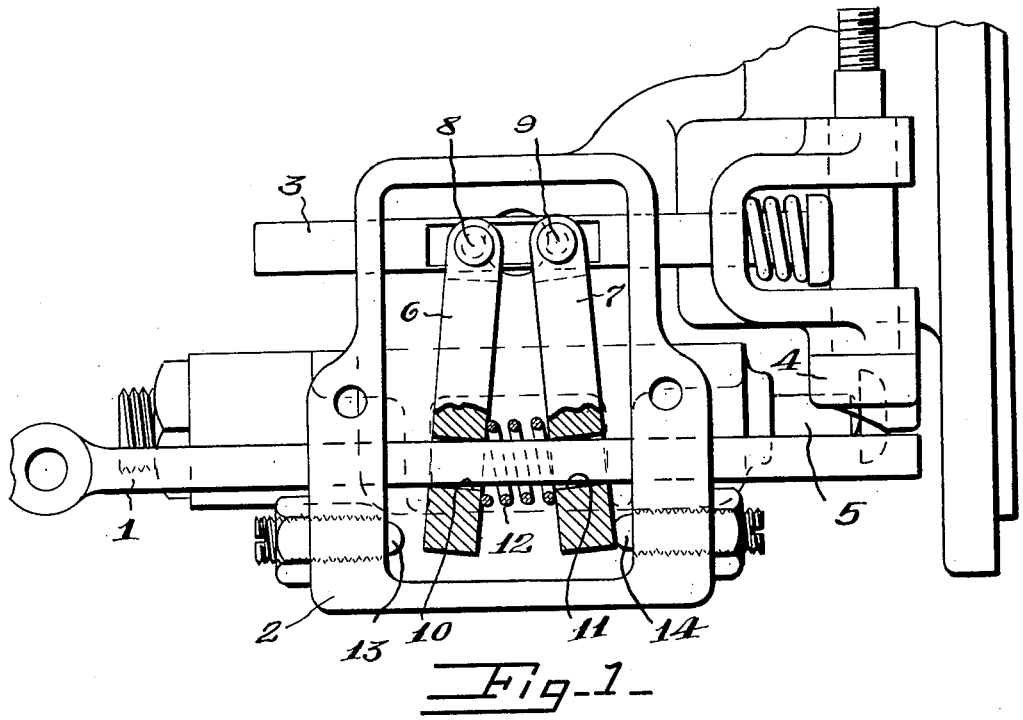
Fig-1-
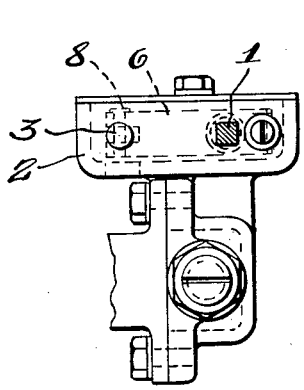
Fig-3-
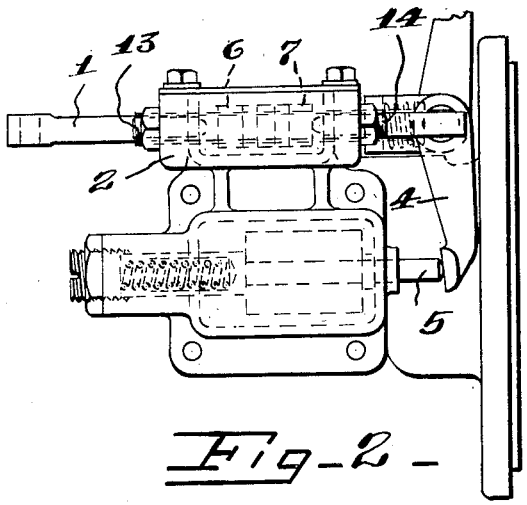
Fig-2-
INVENTOR.
Carl D. Peterson
BY Bodell & Thompson
ATTORNEYS.

Patented July 4, 1933

1,916,893

UNITED STATES PATENT OFFICE

CARL D. PETERSON, OF TOLEDO, OHIO, ASSIGNOR TO SPICER MANUFACTURING CORPORATION, OF TOLEDO, OHIO, A CORPORATION OF VIRGINIA

TWO-WAY CLUTCH DEVICE

Application filed October 12, 1932. Serial No. 637,481.

This invention has for its object a double acting clutch device between an actuator and an actuated part, where the actuator has a greater movement than the actuated part, and by which the actuated part is declutched from the actuator part after being moved a predetermined distance, permitting continued movement of the actuator, and is clutched thereto during the initial part of the retrograde movement of the actuator, and declutched therefrom when the actuated part has returned to its starting position, permitting the actuator to continue its movement in the retrograde direction to its starting position.

It further has for its object a double acting clutch device which is extremely simple, compact, and economical, in construction and consists of few parts which can not readily get out of order.

It further has for its object a two-way clutch device for connecting two parallel rods, or equivalent parts.

The invention consists in the novel features and in the combinations and constructions hereinafter set forth and claimed.

In describing this invention, reference is had to the accompanying drawing in which like characters designate corresponding parts in all the views.

Figure 1 is a plan view of two sliding rods connected by my two-way clutch, the contiguous portion of a casing or support therefor in which the rods slide, being also shown.

Figure 2 is an end elevation of parts seen in Figure 1.

Figure 3 is an elevation of parts seen in Figure 1.

This clutch device is capable of general application for operating various devices, such as valves, brakes, clutches, etc., where a non-adjustable control is desired between a driving and a driven part where the driving part has a greater movement than the driven part, or the driven part has a given or predetermined movement different from the actuator or prime mover.

I have here illustrated my invention as applied to a valve operating mechanism for operating a rear clutch of a transmission gearing in which the rear clutch is controlled from the throw-out mechanism of the main clutch. The particular location, or application of this clutch device forms no part of this invention, and is here shown as applied to a rear clutch throw-out mechanism forming the subject matter of application of Joseph E. Padgett, Ser. No. 635,063, filed September 27, 1932.

I have here shown this clutch device as applied to a mechanism embodying a sliding actuator rod and a sliding actuated rod spaced apart in parallelism to each other.

1 designates the actuator rod slidably mounted in a support or casing 2, the rod being preferably square in cross section.

3 is an actuated rod slidably mounted in the casing 2 parallel to the rod 1. The rod 3 may in turn operate any suitable mechanism, it being here shown as connected to a lever 4 which coacts with a stem 5 of a valve located in the casing 2 to open and close the valve. It is immaterial, insofar as this invention is concerned, what the rod 3 operates, or what the connections are which are operated by the rod, as this invention relates primarily to the double acting clutch for coupling two rods 1 and 3 together. However, the valve having the stem 5 controls the throwing out of a rear clutch of a transmission gearing, and the rod 1 is connected through suitable linkage to the main clutch throwout yoke or pedal of a motor vehicle so that when the main clutch is thrown out, the rear clutch is also thrown out through throw-out mechanism controlled by the valve having the stem 5, and the idea of the two-way clutch is to open the valve immediately upon the initial movement of the rod 1 in one direction and permit continued movement of the rod 1 while holding the valve open, and to permit an immediate return of the valve to its closed position upon the initial retrograde movement of the rod 1 and permit continued retrograde movement of the rod 1 to its starting position.

This two-way clutch includes two like parts carried by one rod, preferably the actuated rod 3 and movable therewith and having clutch means clutching the other or actuator rod, said clutch parts being oppositely acting or disposed whereby one clutch couples the rods together during forward movement of the actuator rod in one direction, and the other part couples the rods together during retrograde movement of the actuator rod, and means for declutching one of said parts when the actuated rod has been shifted a predetermined distance in one direction as to open the valve and for declutching the other of said parts, when the actuated rod has been returned to its starting position, or to close the valve during the initial part of the retrograde movement of the actuator rod 1. Either part, when declutched, serves to hold the actuated rod from movement under any force tending to move it relative to the actuator rod.

In the illustrated embodiment of my invention, these clutch parts comprise levers 6 and 7 pivoted respectively at 8 and 9 to the actuated rod 3, the levers diverging from each other toward the rod 1, so that they are normally arranged at an incline to the rod 1, and having passages 10 and 11 through which the square rod 1 extends and slidably fits when the levers are normal to, or at a right angle to, the rod 1, the walls of said passages binding on the rod 1 when inclined out of normal, or out of right angular relation to the rod 1. Suitable spring means as a single spring 12 interposed between the levers tend to thrust them into an inclined position and hold them in binding relation on the rod 1.

Means are provided for shifting the levers 6 and 7 out of inclined or clutching relation to the rod 1 when the rod 1 has been initially actuated sufficiently to shift the rod 3 so that the movement of the rod 1 can be continued without shifting the rod 3. This means is here shown as adjustable fulcrums, or set screws 13 and 14, arranged in the paths of the levers 6 and 7.

In operation, the clutch parts are normally in the position shown in Figure 1. Upon shifting of the rod 1 forwardly, or to the left (Figure 1), the rod 3 will be shifted therewith due to the binding action principally of the lever 6 on the square part of the rod 1. When however, the rod 1 has been moved far enough to the left, the lever 10 encounters the fulcrum or stop 13 and is held from further movement with the rod 1, but tilts about the fulcrum until the lever approaches right angular relation to the rod 1, it shifting the rod 3 slightly forward during this action. After the lever has been moved into a position approximately at a right angle to the rod 1, the rod 1 can continue its movement to the left without transferring movement to the rod 3, the rod 1 now sliding through the passages 10 and 11 of the levers 6 and 7. During the movement of the rod 1 to the left, it tends to straighten the other lever 7 into a position at a right angle to the rod 1, so that the rod is free to slide through the passages 10 and 11 of both levers 6 and 7, when the lever 6 encounters the stop 13. During the shifting of the actuator rod 1 to the left, the lever 7, in effect, merely idles.

Upon retrograde movement of the rod 1, that is, movement to the right, Figure 1, the lever 7 assumes an inclined position causing the walls of its passage 11 to bind on the rod 1 during the initial part of the retrograde movement of the rod 1, it continuing to bind until the lever 7 now encounters the fulcrum 14 whereupon the lever 7 is moved to a position at a right angle to the rod 1 permitting the rod 1 to slide therethrough. This action takes place after the actuated rod 3 has reached its starting position, during this retrograde movement of the rod 1. During the retrograde movement of the rods 1, 3, the clutch lever 6 merely idles.

This clutch device is particularly advantageous in that it is extremely simple and compact in construction, and consists of few parts which can not get out of order.

What I claim is:

1. The combination of a sliding actuator rod and a sliding actuated rod, a clutch device connecting the rods comprising a part connected to one rod to move as a unit therewith, and having clutch means normally clutching the other rod to shift therewith, whereby the actuated rod moves as a unit with the actuator rod upon the initial movement of the actuator rod, and means for declutching said part from the latter rod when the actuated rod has been actuated a predetermined distance.

2. The combination of a sliding actuator rod and a sliding actuated rod, a clutch device connecting the rods comprising a part secured to the actuated rod to shift therewith, and having clutch means normally clutching the actuator rod to shift as a unit therewith, and means for releasing said part from the actuator rod after the actuated rod has been shifted a predetermined distance, whereby the actuated rod moves with the actuator rod during the initial movement of the actuator rod and is held from retrograde movement during continued movement of the actuator rod while it is held in its actuated position.

3. The combination of a sliding actuator rod and a sliding actuated rod, said rods being spaced apart and parallel to each other, a clutch device including a lever pivoted to the actuated rod and having a passage slidably fitting the actuator rod, when the lever is in one position and bind on the actuator rod when the actuator rod is shifted, springs means acting on the lever normally tending to shift it into such position as to bind on the actuator rod, and means for limiting the movement of the lever with the actuator rod, and thereby shifting the lever into position against the spring means to permit the actuator rod to slide therethrough.

4. The combination of a sliding actuator rod and a sliding actuated rod, a pair of one-way clutch parts secured to the actuated rod and movable therewith and having clutch means for clutching the actuator rod, said clutch parts being oppositely acting and arranged whereby one clutch part couples the rods together during movement of the actuator rod in one direction and the other part couples the rods together during retrograde movement of the actuator, means tending to thrust said parts into clutching position, and means for declutching one of said parts when the actuator rod has been shifted a predetermined distance in one direction and for declutching the other of said parts when said actuator rod has returned in a retrograde direction to its starting position.

5. The combination of a sliding actuator rod and a sliding actuated rod arranged parallel to each other in spaced apart relation, clutch levers pivoted to the actuated rod and having passages through which the actuator rod extends, the levers normally diverging from each other toward the actuator rod and the passages slidably fitting the actuator rod when the levers are normal to the actuator rod, means tending to hold the levers out of normal, whereby the passages bind on the rod, and means for limiting the movement of one lever with the actuator rod in one direction, after the actuated rod has been moved a predetermined distance and thereby causing said lever to move to normal position and permit additional movement of the actuator rod relatively thereto, and means for limiting the movement of the other lever during retrograde movement of the rods and thereby moving the latter lever to position normal with the actuator rod, when the actuated rod has returned to its starting position.

6. The combination of a sliding actuator rod and a sliding actuated rod arranged parallel to each other in spaced apart relation, clutch levers pivoted to the actuator rod and having pasages through which the actuator rod extends, the levers normally diverging from each other toward the actuator rod and the passages slidably fitting the actuator rod when the levers are normal to the actuator rod, means tending to normally hold the levers out of normal whereby the passages bind on the rod, means for limiting the movement of one lever with the actuator rod in one direction and acting as a fulcrum therefor, after the actuator rod has been moved a predetermined distance and thereby causing said lever to move to normal position about the limiting means as a fulcrum, and thereby permit additional movement of the actuator rod relatively thereto, and means for limiting the movement of the other lever during retrograde movement of the rods and acting as a fulcrum therefor, and thereby moving the latter lever to position normal with the actuator rod, when the actuator rod has returned to its starting position, and spring means acting in opposite directions on the levers tending to separate them.

7. The combination of a sliding actuator rod and a sliding actuated rod arranged parallel to each other in spaced apart relation, clutch levers pivoted to the actuated rod and having passages through which the actuator rod extends, the levers normally diverging from each other toward the actuator rod and the passages slidably fitting the actuator rod when the levers are normal to the actuator rod, means tending to normally hold the levers out of normal whereby the passages bind on the rod, means for limiting the movement of one lever with the actuator rod in one direction and acting as a fulcrum therefor, after the actuated rod has been moved a predetermined distance and thereby causing said lever to move to normal position about the limiting means as a fulcrum, and thereby permit additional movement of the actuator rod relatively thereto, and means for limiting the movement of the other lever during retrograde movement of the rods and acting as a fulcrum therefor, and thereby moving the latter lever to position normal with the actuator rod, when the actuated rod has returned to its starting position, and a spring interposed between the levers and acting on the levers in opposite directions.

In testimony whereof, I have hereunto signed my name, at Toledo in the county of Lucas and State of Ohio this 19th day of September, 1932.

CARL D. PETERSON.